April 9, 1963 R. W. GOODE 3,084,768
BRAKE DISK

Original Filed July 20, 1956 2 Sheets-Sheet 1

INVENTOR.
ROBERT W. GOODE
BY
Hansen and Lane
ATTORNEYS

April 9, 1963 R. W. GOODE 3,084,768
BRAKE DISK
Original Filed July 20, 1956 2 Sheets-Sheet 2
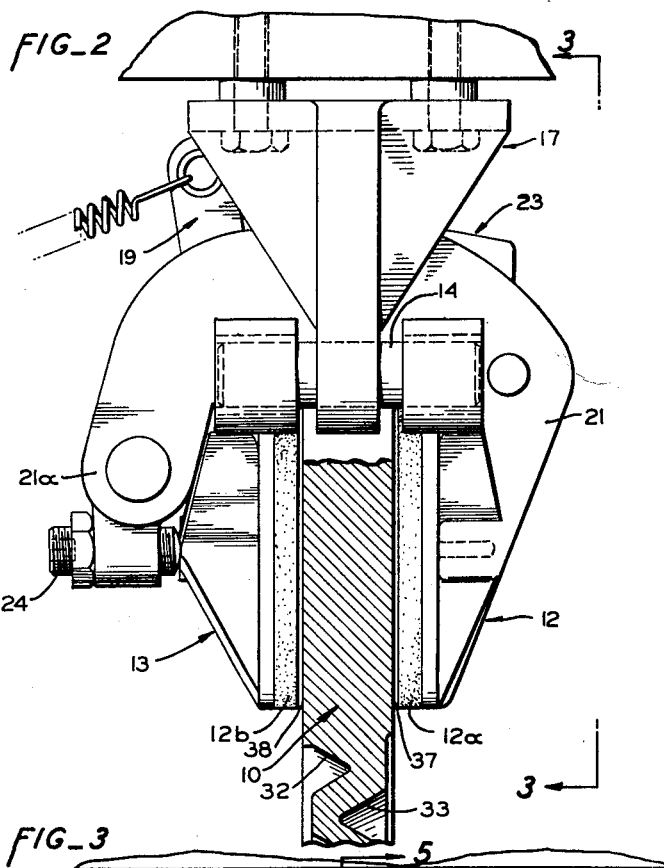
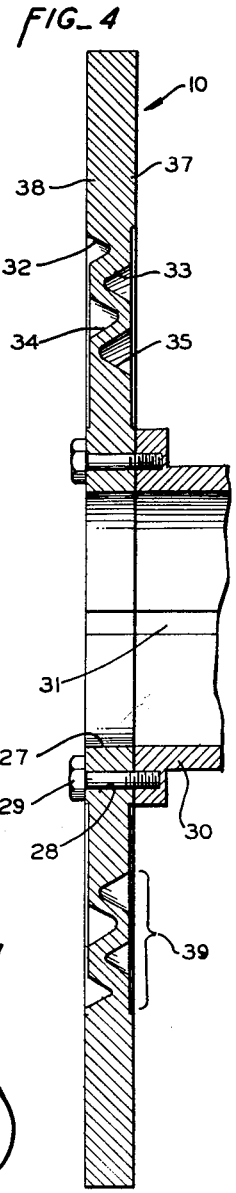
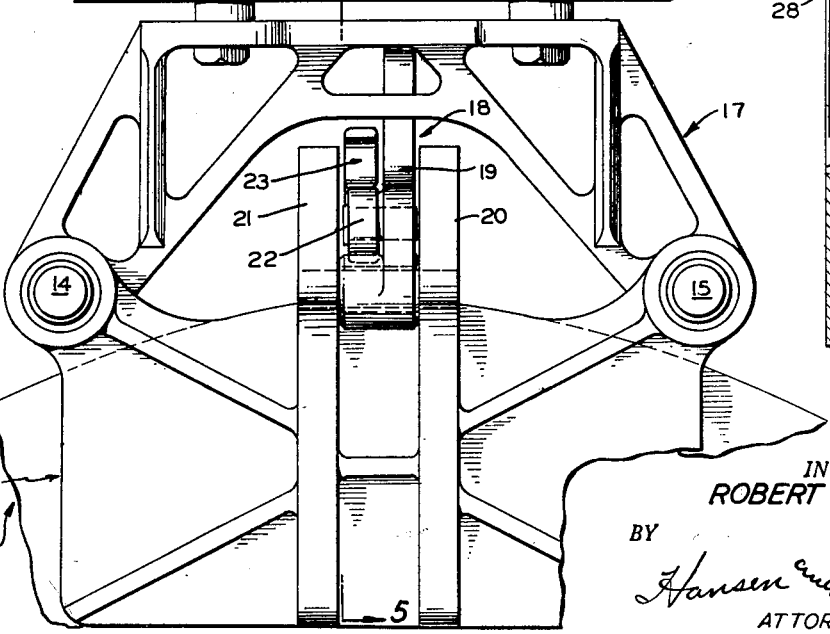
INVENTOR.
ROBERT W. GOODE
BY
Hansen and Lane
ATTORNEYS

United States Patent Office 3,084,768
Patented Apr. 9, 1963

3,084,768
BRAKE DISK
Robert W. Goode, Morgan Hill, Calif., assignor to Gerald A. M. Petersen, Santa Clara, Calif.
Original application July 20, 1956, Ser. No. 599,071, now Patent No. 2,959,253, dated Nov. 8, 1960. Divided and this application Apr. 5, 1960, Ser. No. 20,193
2 Claims. (Cl. 188—218)

The present invention relates to a brake, and pertains more particularly to an improved disk for a disk type brake wherein a pair of brake shoes engage opposite faces of the disk in parallel, pressure-equalized relation.

In recent years a considerable amount of development work has been done on disk type brakes, and such brakes have been used on many applications wherein the older drum type brakes are apt to overheat and fade, with sometimes costly and dangerous results.

While disk type brakes have many recognized advantages over the more widely used drum type brakes, some of the former developed to date have been difficult to balance and to maintain in full braking engagement with the disk. Also during a severe braking operation, the disk may warp under the heat developed, and in some cases the shoes may be thrown out of alignment, causing them to seize with possibly dangerous results.

The present invention contemplates the provision of an improved disk for a disk-type brake and is a division of application Serial No. 599,071 filed July 20, 1956, for for a Disk Brake which issued on November 8, 1960, as U.S. Patent No. 2,959,253.

The invention provides a disk for a disk-type brake wherein two brake shoes applied to opposite marginal faces of the disk, and are maintained in parallel relation to each other and to the disk, so that the pressures applied by the shoes on opposite faces of the disk tend to be equalized by a brake operating mechanism.

The invention also provides a brake disk which is so constructed in the zone radially inwardly of the braking surface thereon as to facilitate the dissipation of heat generated by the braking action, and to reduce the transfer of heat radially inwardly toward the hub.

A further object of the brake disk structure is to reduce warping of the disk under severe and prolonged braking.

These and other objects and advantages of the invention will be apparent from the following description and the accompanying drawings, consisting of two sheets, wherein—

FIG. 2 is an enlarged, fragmentary, sectional view taken along line 2—2 of FIG. 1.

FIG. 3 is a similarly enlarged fragmentary elevational view looking in the direction of the arrows 3—3 in FIG. 2.

FIG. 4 is a sectional view in reduced scale taken diametrically through the brake disk.

Figure 1:
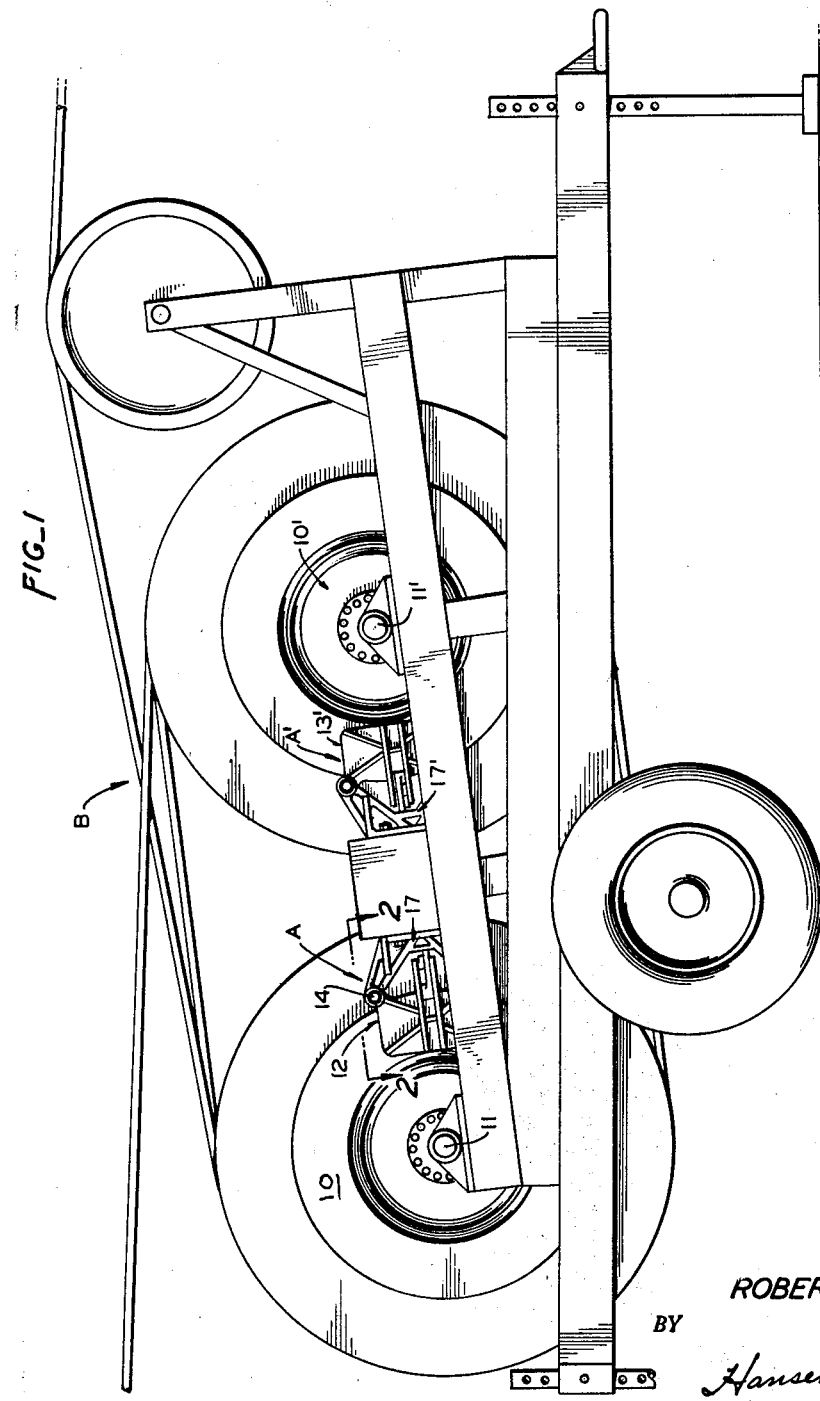
FIG. 1 is a side elevational view of a cable tensioning mechanism having a disk type brake mechanism embodying the present invention mounted thereon.

Briefly, the invention is embodied in a brake A comprising a disk 10 which may be secured to a shaft 11, rotation of which is to be controlled by the brake. A pair of brake shoes 12 and 13 are fixedly mounted in spaced parallel relation at the perimeter of the disk for guided, slidable movement on the opposite ends of a pair of shoe support rods 14 and 15, which are secured medially of their lengths to a shoe supporting frame 17. The brake shoes 12 and 13 are positioned on opposite sides of the disk 10, so as to grip the latter therebetween upon actuation of the brake. The brake shoes 12 and 13 are of a length such as to engage only a small segment of the disk 10 as best seen in FIGS. 1 and 3.

For further particulars relating to the mechanics and operation of the braking mechanism reference may be had to my U.S. Patent No. 2,959,253 which was previously mentioned.

Suffice it to say that the brake shoes 12 and 13 are disposed to engage segmental portions of opposite faces of the brake disk 10 adjacent its radial extremity for retarding turning of the disk 10.

For purposes of the present invention it matters not whether the disk 10 is secured to the shaft 11 or mounted for rotation relative thereto. It is only important to understand that the disk 10 is so associated with a load as to cause rotation or overriding of the disk unless it is retarded by the brake mechanism.

Referring to the details of the illustrated embodiment A of the invention, the brake disk 10 is a homogeneous monometallic noncavitied body of suitable metal, such as steel, all in one common plane with a center hole 27 (FIG. 4) there in of a size to fit onto the shaft 11 (FIG. 1). A plurality of openings 28 are provided around the central shaft opening 27 in the disk to receive bolts 29 (FIGS. 1 and 4) which secure the disk 10 to a hub flange 30. If it is desired that the disk 10 be secured to the shaft 11 the hub flange 30 is fixedly secured to the shaft 11 as by means of a conventional key (not shown) mounted in a keyway 31.

Alternatively, however, it will be appreciated that the hub 30 may be formed as a part of a bull wheel and that the disk 10, hub 30 and bull wheel may be mounted as a unit upon the shaft 11 for rotation with respect to the same. This arrangement is adequately disclosed, described and claimed in U.S. Letters Patent No. 2,948,483 which issued August 9, 1960 for Cable Stringing Apparatus.

All of the foregoing is generally known in the art and merely environmental insofar as this application is concerned. The present invention contemplates the embodiment of cooling means in such a disk for overcoming excessive heat created by brake shoes at the outer rim of the disk as compared with the temperature differential at the hub of the disk. To this end a plurality of circular grooves 32, 33, 34 and 35, of progressively reduced diameter, concentric with the disk 10 and with each other, are provided alternately on opposite sides of the disk 10 inwardly of its braking surfaces 37 and 38. The braking surfaces 37 and 38 are parallel outside faces of the marginal rim of the disk 10. The grooved zone 39 of the disk 10 is a solid web formed integrally with the marginal rim thereof and confined wholly between the parallel planes in which the braking surfaces 37 and 38 are located. The circular grooves 32, 33, 34 and 35 preferably are of similar, rounded, V cross sectional shape, and also preferably are of gradually increasing depth from the radially outermost one 32 to the innermost one 35. This produces a corrugating and gradual thinning of the metal throughout the grooved or corrugated zone 39 of the disk as is clearly apparent in FIG. 4. This gradual thinning and corrugating of the metal throughout the zone 39 has a three-fold effect, as follows: (1) It increases the exposed surface area throughout the zone 39 over that which would be exposed if this zone were not grooved and thus assists in dissipation of the heat generated by a braking operation. (2) By gradually reducing the thickness of the metal from the outer to the inner limits of this zone it resists and controls the conduction of such heat from the marginal braking zone into the hub portion. (3) By permitting expansion of the metal in the corrugated zone 39 it reduces the probability of warping in the disk.

The device is illustrated as being mounted on a cable tensioning mechanism, but it is obvious that the invention is capable of numerous other applications.

While I have illustrated and described a preferred embodiment of the present invention, it will be understood however, that various changes and modifications may be made in the details thereof without departing from the scope of the invention as set forth in the appended claims.

Having thus described the invention, what I claim as new and desire to protect by Letters Patent is defined in the following claims:

1. In a disk brake, a brake disk comprising a homogeneous nonmetallic body having a pair of annular braking surfaces located in parallel planes and marginally on opposite sides of the disk, an integral solid web between the axis of said disk and the annular braking surfaces thereof, and a plurality of circular grooves formed in and on either side of said integral solid web concentric with the axis of said disk, the surfaces between said grooves being substantially in the same plane as the annular braking surface, the grooves on alternate sides of said web being of gradually diminishing radius from the braking surfaces toward the axis of said disk.

2. In a disk brake, a brake disk comprising a homogeneous nonmetallic body having a pair of annular braking surfaces located in parallel planes and marginally on opposite sides of the disk, an integral solid web between the axis of said disk and the annular braking surfaces thereof, and a plurality of circular grooves formed in and on either sides of said integral solid web concentric with the axis of said disk and of progressively decreased radius alternately on opposite sides of said disk, the surfaces between said grooves being substantiagly in the same plane as the annular braking surface, said grooves being of substantially V shaped configuration and of gradually increasing depth from the braking surfaces toward the axis of said disk, and the metal of said grooves gradually diminishing in thickness from the outermost to the innermost groove to resist heat conduction radially inward from the portion of the disk between the braking surfaces through said grooves.

References Cited in the file of this patent
UNITED STATES PATENTS

| | | |
|---|---|---|
| 1,571,746 | Wemp | Feb. 2, 1926 |
| 2,103,201 | Eksergian | Dec. 21, 1937 |
| 2,215,420 | Eksergian | Sept. 17, 1940 |
| 2,629,464 | Helsten | Feb. 24, 1953 |